United States Patent [19]

Edmonds

[11] Patent Number: 4,605,173

[45] Date of Patent: Aug. 12, 1986

[54] SIZE REDUCTION MACHINE

[76] Inventor: Harvey A. Edmonds, 108 Paradise Harbor Blvd., North Palm Beach, Fla. 33408

[21] Appl. No.: 596,651

[22] Filed: Apr. 4, 1984

[51] Int. Cl.⁴ .............................................. B02C 19/08
[52] U.S. Cl. ........................................ 241/36; 241/69; 241/74; 241/84.2; 241/199.7; 241/199.12; 241/285 B; 241/287
[58] Field of Search ................... 241/34, 36, 37.5, 69, 241/74, 83, 84, 84.2, 84.3, 84.4, 199.7, 199.12, 285 R, 285 B, 285 A, 287

[56] References Cited

U.S. PATENT DOCUMENTS

| | | | |
|---|---|---|---|
| 745,416 | 12/1903 | Breakell | 241/199.7 |
| 3,980,235 | 9/1976 | Kuhlman | 241/84 |
| 4,172,515 | 10/1979 | Wochnowski | 241/36 X |
| 4,179,074 | 12/1979 | Flavel | 241/36 X |

OTHER PUBLICATIONS

Quadro Engineering, Inc., Quadro Models: 197-1, 196-5, 198-2.
Comomil by Conestoga Machine, Jun. 2, 1976.

*Primary Examiner*—Howard N. Goldberg
*Assistant Examiner*—Timothy V. Eley
*Attorney, Agent, or Firm*—Gary, Juettner & Pyle

[57] ABSTRACT

A size reduction machine for reducing the particle size of material, comprises a frame, an arm pivotally connected intermediate its ends to the frame, a counter weight movably connected to one end of the arm, a motor having a drive shaft mounted on the other end of the arm, an impeller connected to the free end of the motor shaft, an enclosure carried by the frame below the motor, the enclosure having fenestrated side walls and an open top for receiving the motor shaft and impeller, the motor and impeller being bodily movable into and out of the enclosure upon pivotal movement of the arm, and an adjustable stop positioned between the frame and the arm for limiting the maximum travel of the impeller into the enclosure.

7 Claims, 10 Drawing Figures

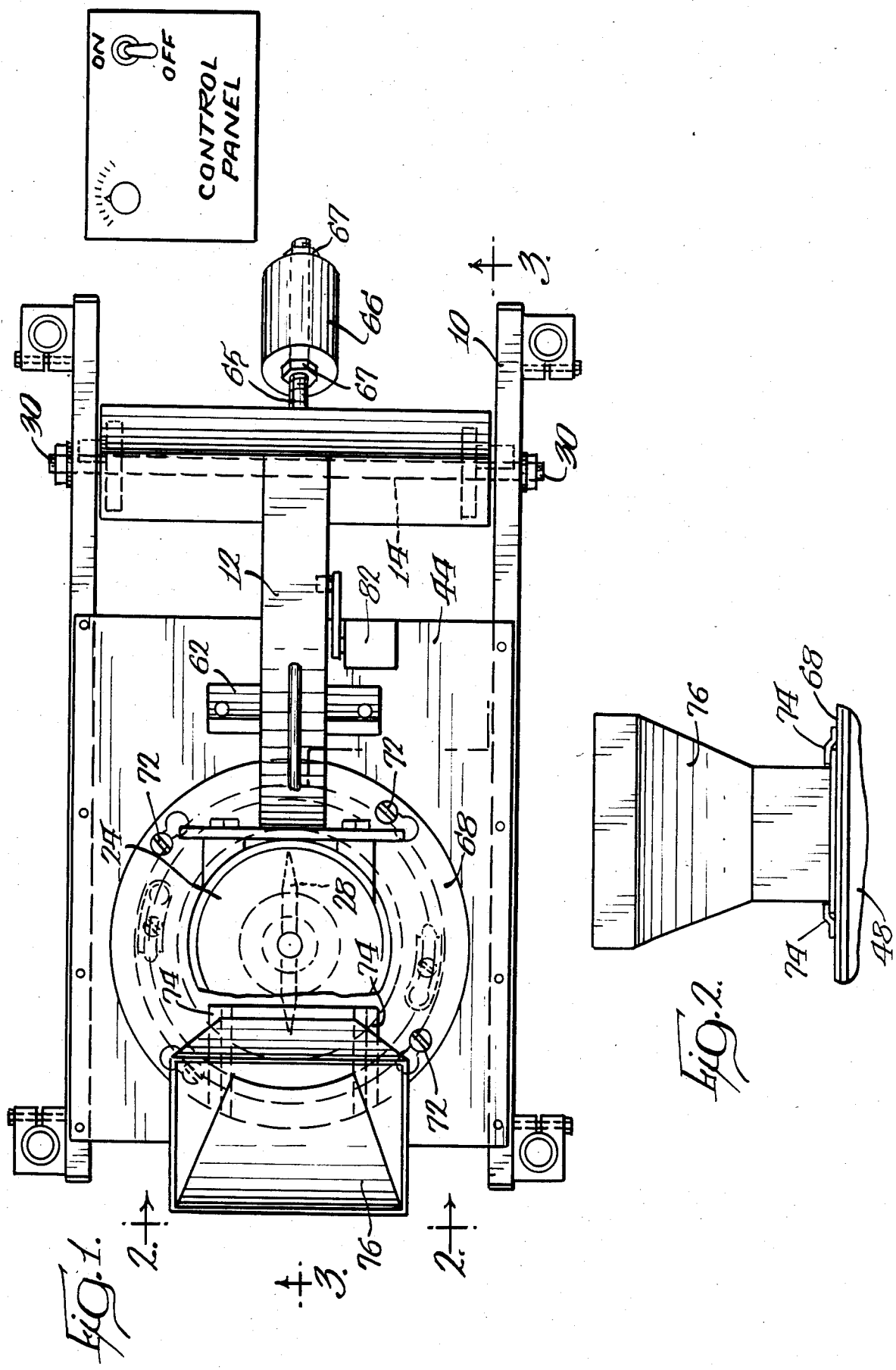

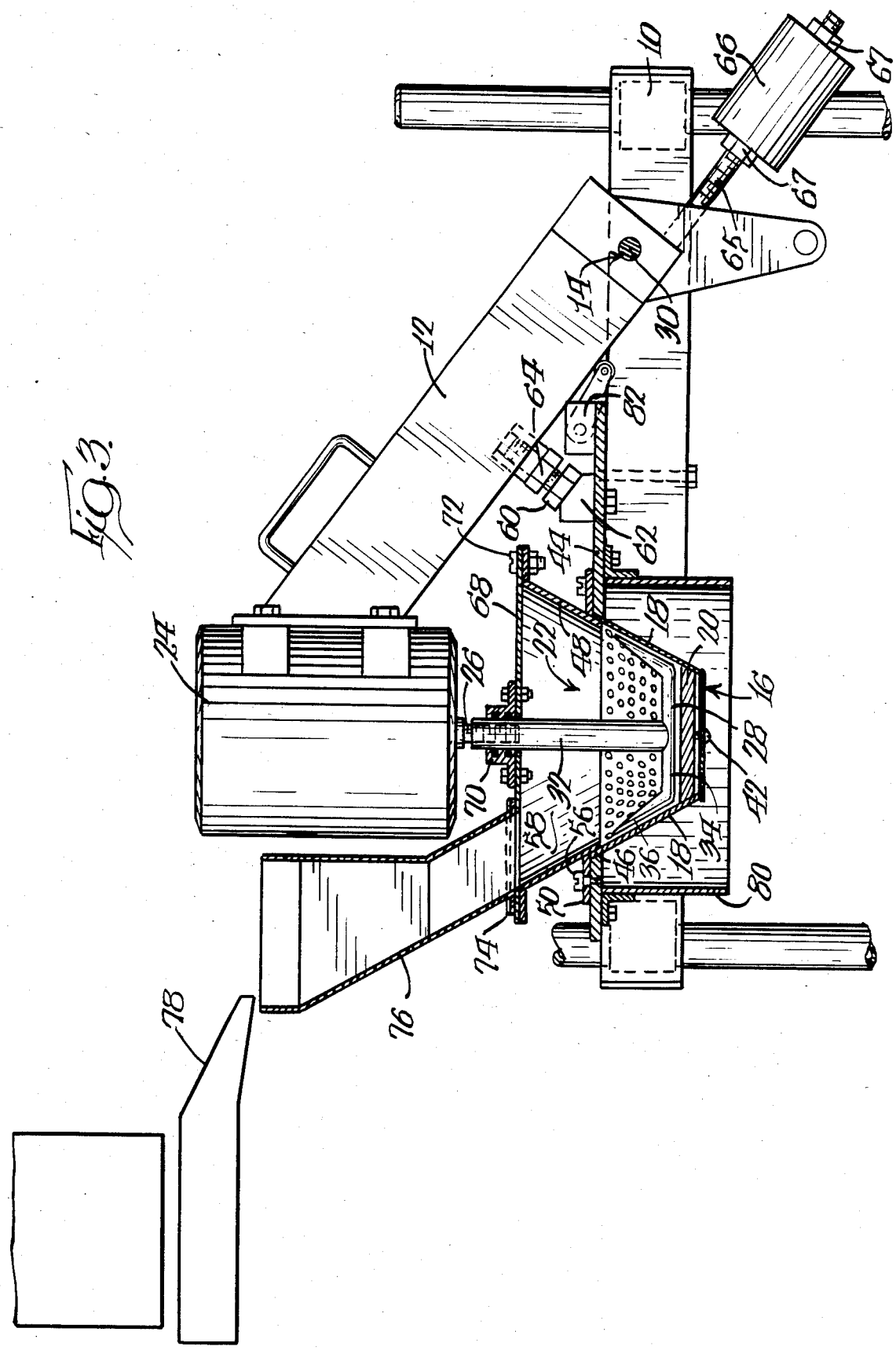

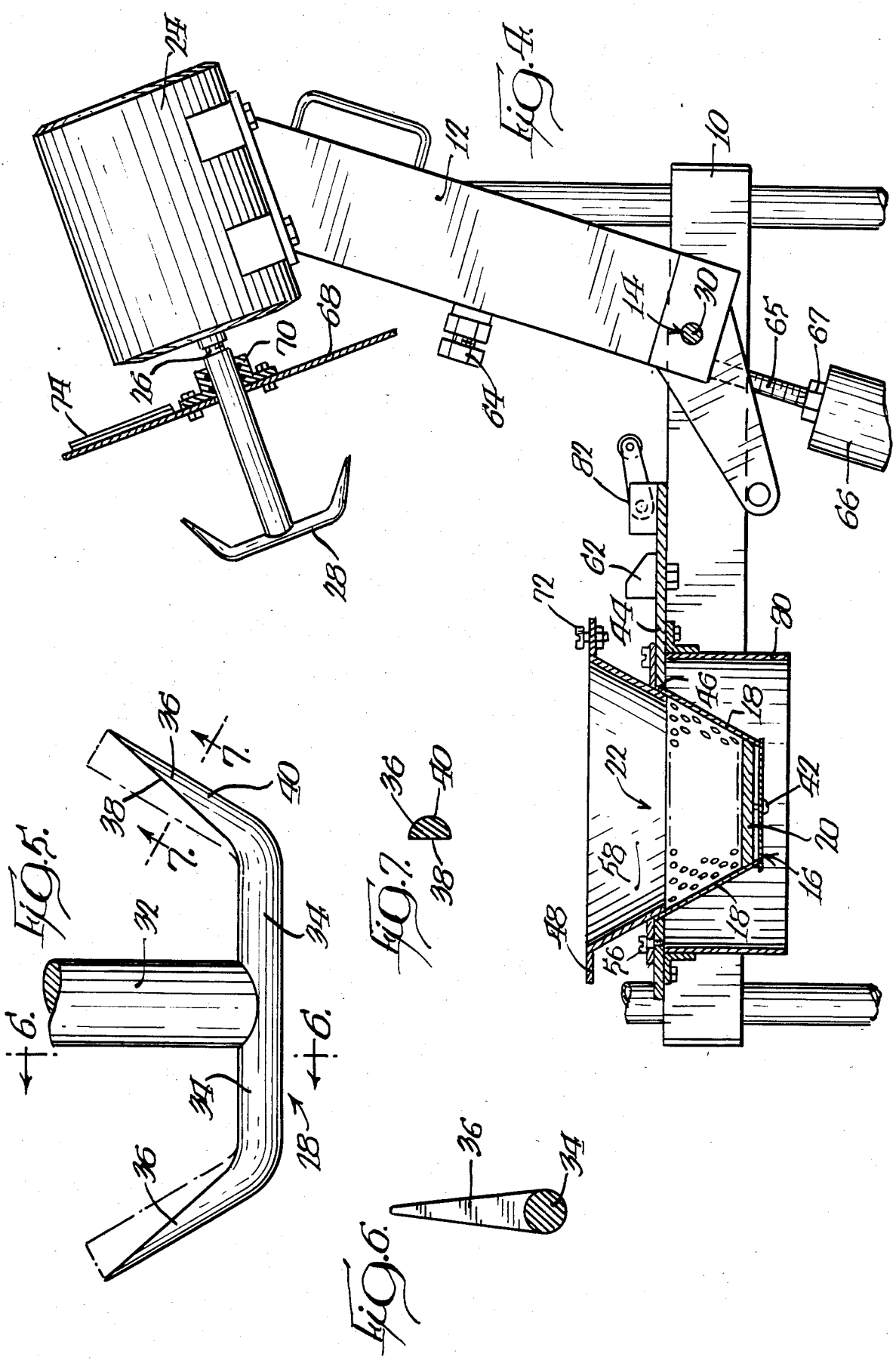

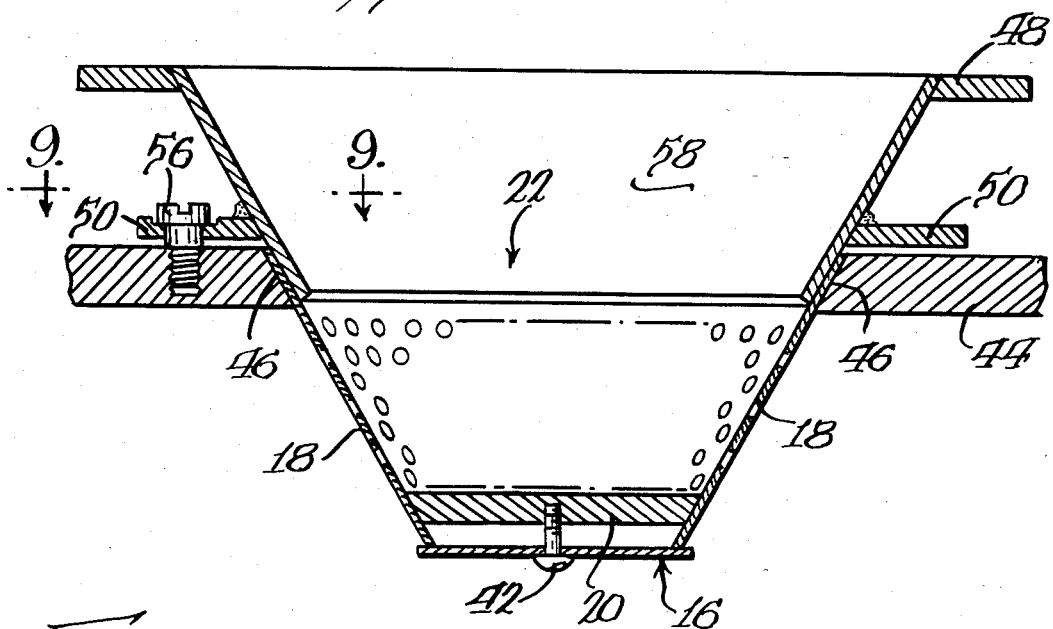
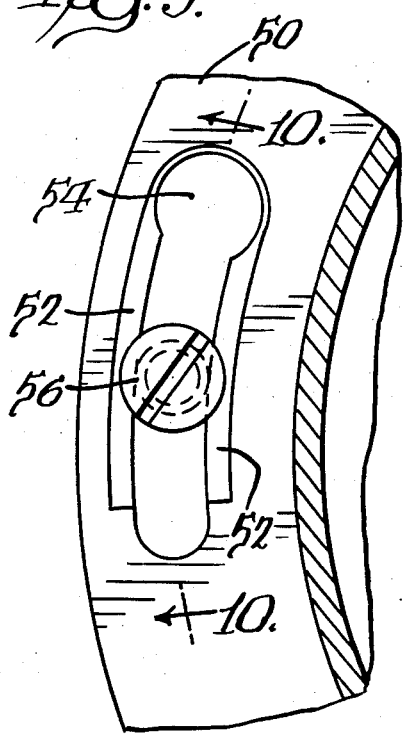
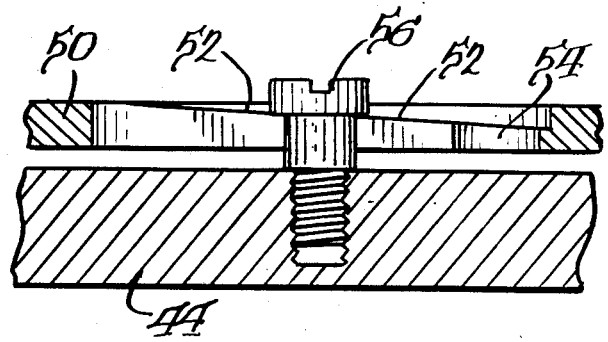

ND MACHINE

BACKGROUND OF THE INVENTION

This invention relates to size reduction or comminution machines for reducing the particle size of a given material.

In many industries, for example the pharmaceutical and food industries, it is often desirable to comminute particulate matter, i.e., to reduce the particle size of a given material. Various size reduction processes and machines have been proposed to accomplish the desired result. For example comminution has been accomplished by placing a material on a horizontal sieve and then forcing the material through the sieve with horizontally reciprocating paddles. In a rotating version, such as manufactured by Quadro Engineering, Inc., St. Jacobs, Ontario, Canada, an impeller is rotated within a cylindrical or frusta-conical sieve or fenestrated enclosure, the impeller being belt driven by a motor.

The prior art size reduction machines have six primary draw backs. First, they are difficult to maintain. In many applications, e.g. pharmaceutical and food processing, sterility is most important, thus requiring frequent maintenance of the machinery. With most prior art devices this maintenance function requires substantial disassembly, cleaning and reassembly of the machinery, which is laborious, time-consuming and of course, unproductive.

Second, many prior art devices tend, in large degree, to pulverize the product. In many applications, it is desirable to have a finished product having uniform particle size, without an appreciable amount of fines. Many of the prior art devices have blunt paddles, blades or impellers which overly pulverize the material, resulting in diverse particle sizes and a high percentage of fines in the finished product.

Third, many prior art devices have impellers, set in a fixed position a fixed distance from the sieve. For different materials, it is desirable to adjust the clearance between the impeller and sieve to achieve the desired finished particle size and to maximize production. Prior art devices require the operator to shim the impeller manually in order to change the clearance between the impeller and the sieve, which is laborious and time-consuming.

Fourth, once the impeller-sieve clearance is set, it remains fixed during production. However, production rates could be enhanced if the impeller were allowed to float in relation to the sieve—increasing the clearance when processing a high volume of material and reducing the clearance when processing a small volume of material.

Fifth, the prior art devices do not provide any means for automatically regulating the feed of material into the size reduction machine. This requires an operator to monitor the machine at all times during operation, to regulate the inflow of material into the size reduction machine.

Finally, most prior art devices are belt driven, which increases the complexity of the machine and the difficulty of sanitizing the same, and which is far less energy efficient than direct drive.

It would be desirable to have a size reduction machine that produces a finished product having uniform particle size, is inexpensive, easily maintained, and overcomes the disadvantages of the prior art.

SUMMARY OF THE INVENTION

The apparatus of the invention comprises a frame, an arm pivotally connected intermediate its ends to the frame, a counter weight movably connected to one end of the arm, a motor having a drive shaft mounted on the other end of the arm, an impeller mounted directly on the free end of the motor shaft, an enclosure carried by the frame below the motor, the enclosure having fenestrated side walls, a bottom wall and an open top for receiving the motor shaft and impeller, the motor and impeller being bodily movable into and out of the enclosure upon pivotal movement of the arm, an adjustable stop positioned between the frame and the arm for limiting the maximum travel of the impeller into the enclosure, a power feeder adjacent to the enclosure for feeding material into the enclosure, and a switch for regulating the rate of feed of material from the power feeder to the enclosure based on the position of the arm in relationship to the frame.

Accordingly, one may bodily move the impeller and motor shaft into and out of the enclosure through the open top of the enclosure, simply by pivotal movement of the arm. This feature allows ready access to the inside of the enclosure and to the impeller for inspection and maintenance, and for ease and convenience of service and sanitation.

The impeller comprises a plurality of blades radiating from the drive shaft of the motor, each blade having a semi-circular cross-section for at least a portion of its length. The curved side of the blade is located adjacent the fenestrated side walls of the enclosure, and contributes in forcing the material through the fenestrated side walls of the enclosure. The side of the blade opposite the enclosure is machined off to produce a reduced profile, thus reducing the area of impact between the impeller blade and the material. Consequently, pulverization of the material due to impact with the blades is reduced, and comminution to a uniform particle size is achieved.

The adjustable stop comprises a stop block mounted on the frame and an adjustable stop screw connected to the arm. By adjusting the stop screw, the operator may set the minimum clearance between the impeller and the enclosure, thereby eliminating the need to shim the impeller. Furthermore, the stop can be adjusted during operation, thereby permitting the operator to fine-tune the clearance between the impeller and the enclosure without shutting down the machine and without loss of production time.

The stop limits only the maximum travel of the impeller into the enclosure, i.e., it sets the minimum clearance between the impeller and the enclosure. It does not prohibit upward pivotal movement of the impeller mounting arm on limit upward travel of the impeller, thus permitting the impeller to float in relation to the enclosure depending on the volume of material being processed. The frequency and magnitude of float depends on the properties of the material being processed and the downward force applied to the impeller. In accordance with the invention, the magnitude of the downward force on the impeller due to the weight of the arm, motor and impeller can be regulated by adjusting the position of the counter weight. Moreover, the position of the counter weight can be adjusted while the apparatus is in operation, thus giving the operator the ability to fine tune the aforesaid floating action to achieve maximum output without shutting down the machine and without loss of production time.

The power feeder regulating switch is positioned between the frame and the arm and can be adjusted to cut-off electrical power to the power feeder when, due to an excess volume of material within the enclosure, the impeller has floated upwardly a predetermined distance. The switch resumes supply of electrical power to the power feeder when the impeller returns to its normal position due to material within the enclosure having been comminuted and discharged through the fenestrated side walls of the enclosure. Thereby, the switch performs the function of detecting the magnitude of float of the impeller in relation to the enclosure, which is due to the quantity of material within the enclosure, and based thereon turns off and on the power feeder to regulate the rate of feed of material from the power feeder into the enclosure.

As previously mentioned, the impeller is connected directly to the motor shaft, thereby eliminating inefficient belt drives.

Other objects and advantages of the invention will become apparent from the following detailed description, as read in connection with the accompanying drawings.

BRIEF DESCRIPTION OF THE DRAWINGS

FIG. 1 is a plan view of a preferred embodiment of the size reduction machine of the invention;

FIG. 2 is an end elevation, taken along line 2—2 of FIG. 1;

FIG. 3 is a side view, partly in section and partly in elevation, taken along line 3—3 of FIG. 1;

FIG. 4 is a side view similar to FIG. 3 illustrating the motor and impeller bodily moved out of the enclosure upon pivotal movement of the arm;

FIG. 5 is a side elevation of the impeller;

FIG. 6 is a cross-sectional view of one of the base portions of the impeller blades taken along line 6—6 of FIG. 5;

FIG. 7 is a cross-sectional view of the end portion of one of the impeller blades taken along line 7—7 of FIG. 5 and illustrating the semi-circular portion of the blade;

FIG. 8 is a cross-sectional detail of the enclosure;

FIG. 9 is a plan view detail taken along line 9—9 of FIG. 8; and

FIG. 10 is a cross-sectional detail taken along line 10—10 of FIG. 9.

DETAILED DESCRIPTION

Referring to the drawings, especially FIGS. 3 and 4, the preferred embodiment of the apparatus of the invention comprises a frame 10; an arm 12 pivotally connected at 14 to the frame 10; a material treatment enclosure 16 carried by the frame 10, having fenestrated side walls 18, an imperforate bottom wall 20 and an open top at 22; a motor 24 mounted to one end of the arm 12; and having a drive shaft 26, which in operative position is aligned generally with the vertical axis of the enclosure 16; and an impeller 28 connected directly to the free end of the motor shaft 26.

By virtue of the pivotally mounted arm 12, the entire motor and impeller assembly may be swung from an operative position wherein the impeller 28 is operatively positioned within the material treatment enclosure 16, as shown in FIG. 3, and an elevated, inoperative, service position, as shown in FIG. 4, wherein the impeller is completely removed from the enclosure to facilitate cleansing, repair and other servicing of both the impeller and the components of the enclosure 16.

The frame 10 and arm 12 may be fabricated from stainless steel, carbon steel or dairy metal; stainless steel being preferable for processing materials in a sanitary environment. The pivotal connection between the frame 10 and arm 12, shown at 14, may be formed by running a steel bar 30 through holes drilled in the sides of the frame 10 and through a hole drilled in the arm 12, as shown in FIGS. 1 and 3. The pivotal connection 14 is preferably located on the same horizontal plane as the mid-point of the enclosure 16 so that upon pivotal movement of the arm 12 the impeller 28 is moved into and out of and within the interior of the fenestrated walls 18 in a direction that is essentially or primarily vertical, in alignment with the vertical axis of the enclosure 16 and with very little tilt relative to said axis, so as to maintain the proper operative relationship between the impeller 28 and the fenestrated walls 18.

The motor 24 is of conventional variety as is commercially available. A one HP, 220 volt, 1800 R.P.M., three phase motor has been found to work well in connection with an enclosure 16 having 60 square inches of fenestrated side walls 18.

The impeller 28 comprises a vertical shaft 32 and a plurality of radiating blades 34. The impeller 28 may be fabricated from circular steel bars, stainless steel being preferable for sanitary applications. The impeller shaft 32 and the motor shaft 26 are preferably provided with cooperative quick disconnect means, such a bayonet connection, to facilitate ready mounting and removal of the impeller 28. The blades 34 of the impeller 28 radiate outwardly perpendicular to the impeller shaft 32, for a portion of their length, and then angle upwardly and outwardly, so as to provide end portions 36 which are generally parallel the inside profile of the enclosure 16. As can be seen in FIG. 3, the end portions 36 of the blades 34 are generally parallel to the fenestrated side walls 18 of the enclosure 16 in the operative condition of the machine. The inner surfaces 38 of the end portions 36 are machined to progressively taper toward their ends, as illustrated in FIGS. 5 through 7. The inner surface 38 of each end portion 36 is flat, while the outer surface 40 adjacent to the fenestrated side walls 18 is curved, as shown in FIG. 7. The purpose of this semi-circular taper of the end portion 36 of the blades 34 is to reduce the mass of the impeller 28 and to minimize pulverization of the material. Also, the outer, rounded surface 40 of the end portion 36 provides a wedge or cam surface in relation to the material and the sieve which contributes to smoothness of operation in forcing the material through the fenestrated side walls 18 of the enclosure 16. The inner surface 38 is machined to minimize pulverization by impact of the blades 34 against the material and to minimize the amount of material thrown upwardly and/or inwardly within the enclosure 16.

The enclosure 16 having fenestrated side walls 18 may be fabricated from carbon or stainless steel, stainless steel being preferable in sanitary applications. The thickness of the side walls 18 depends on the properties of the material being processed and the desired size of the fenestrations. In the preferred embodiment, the enclosure 16 is of inverted frusta-conical shape having fenestrated side walls 18, an open top at 22 and an imperforate bottom wall 20 detachably secured in the bottom of the side walls 18 by a detachable connection 42. The enclosure 16 is carried on the frame 10 by a base plate 44 having a beveled circular opening 46 therein for receiving the top edge of the side walls 18 of the enclosure 16. The bottom edge of an inverted frustaconical adaptor 48 is fitted into the top edge of the side walls 18 of the enclosure 16, thereby pinching the top edge of the side walls 18 between the beveled edge 46 of the base plate 44 and the bottom edge of the adaptor 48, as shown in FIG. 8.

The top edge of the side walls 18 of the enclosure 16 may be securely wedged between the adaptor 48 and base plate 44 by the clamping device illustrated in FIGS. 8, 9 and 10. Specifically, the adaptor 48 carries an exterior concentric flange 50 spaced above the bottom edge of the adaptor 48. The flange 50 has a plurality of concentric, spaced apart beveled depressions 52 therein. Each depression 52 has a keyhole slot 54 therethrough. A fastener 56 extends through each slot 54 into the base plate 44, thereby fastening the adaptor 48 to the base plate 44. Rotation of the adaptor 48 in one direction causes the beveled depressions 52 to be progressively forced against the heads of the fasteners 56, thereby causing the adaptor 48 to be forced downwardly toward the base plate 44 to wedge the upper portion of the side walls 18 of the enclosure 16 between the adaptor 48 and the beveled portion 46 of the base plate 44. Rotation of the adaptor 48 in the opposite direction releases the beveled depressions 52 from the heads of the fasteners 56 and aligns the enlarged part of the keyhole slots 54 with the heads of the fasteners 56 to accommodate removal of the adaptor 48 from the base plate 44 to facilitate access to the enclosure 16 for maintenance, repair and replacement. Thus, the clamping device permits quick release of the enclosure, and has the further advantage of accommodating enclosures having different side wall thicknesses.

The adaptor 48 serves the further purpose of creating an expansion chamber 58 above the enclosure 16 to enhance the processing of the material. The volume of the expansion chamber 58 depends on the properties of the material being processed, in that some materials bulk more than others while being processed and thus require more expansion volume. Different adaptors 48, of variable heights, may be used for different materials.

An adjustable stop 60 is positioned between the frame 10 and the arm 12. The stop 60 comprises a stop block 62 mounted to the frame 10 and an adjustable stop screw 64 connected to the arm 12. Both the stop block 62 and the stop screw 64 may be fabricated from carbon or stainless steel. The purpose of the stop 60 is to limit the maximum travel of the arm 12 downwardly about its pivotal connection 14 to the frame 10, and thus, limit the maximum travel of the impeller 28 into the enclosure 16. By adjusting the screw 64 one can easily set the minimum clearance between the impeller 28 and the enclosure 16, either in the quiescent state or when the machine is in full operation, thereby to achieve the proper adjustment without loss of production time.

The stop 60 does not restrain upward travel of the arm 12 and impeller 28 in relation to the enclosure 16. Thus, the impeller 28 is free to float upwardly in relation to the bottom wall 20 of the enclosure 16 when the same is flooded with material. When the volume of material within the enclosure 16 dissipates, the weight of the arm 12, motor 24 and impeller 28 forces the impeller 28 downwardly until the stop screw 64 engages the stop block 62.

A counter weight 66, movably attached to arm 12 to the side of pivot 14 opposite the motor 24, regulates the downward force on the impeller 28, and thus controls the magnitude and frequency of the floating action of the impeller 28. A threaded steel rod 65 may be welded to the arm 12 to constitute an extension thereof. A steel or lead counter weight 66 having a hole therein may be slipped over the rod 65 and secured thereto by lock nuts 67. The magnitude of the downward force on the impeller 28 due to the weight of the arm 12, motor 24 and impeller 28 can be regulated by moving the weight 66 closer to or farther from the pivot 14 by adjusting the nuts 67. The position of the counter weight 66 can be adjusted while the apparatus is in operation, thus giving the operator the ability to fine tune the aforesaid floating action to achieve maximum output without loss of production time.

In the preferred embodiment, a cover plate 68 is provided for the top of the adaptor 48 to serve as a shield to prevent material from flying from the enclosure 16 during operation. The cover plate 68 is mounted on the shaft 32 of the impeller 28 by means of a swivel bearing assembly or seal structure 70 which accommodates rotation of the impeller shaft 32 relative to the cover 68 and which also accommodates sliding and tilting movement of the shaft 32 relative to the cover 68 so as not to interfere with the above-described floating action of the impeller 28 about the pivot axis 14 of the arm 12 when the machine is in operation. By thus mounting the cover plate 68 on the impeller shaft 32, the cover 69 is also swung out of the way when the impeller 28 is removed from the enclosure 16, thereby facilitating access to and servicing of the impeller 28 and the components of the enclosure 16. When the impeller 28 is in operative position, the cover plate 68 is preferably connected to an upper flange portion of the adaptor 48 by one or more bolts 72 or similar quick connect devices.

At the marginal portions thereof opposite the arm 12, the cover plate 68 includes a hopper feed opening and marginal flanges 74 at both sides of the opening for slidable reception of the bottom edge portions of a material feed hopper 76 which serves to funnel material into the adaptor 48 and the enclosure 16. The hopper 76 is thus readily detachable from the cover plate 68, and the cover plate 68 in turn is readily detachable from the adaptor 48 to facilitate removal of the motor 24 and impeller 28 assembly from the enclosure 16 for convenience and quick access to the operative components of the machine.

Also in the preferred embodiment, a power feeder 78 is located adjacent the hopper 76 for feeding material into the hopper 76 and from there, through the adaptor 48 into the enclosure 16. Also, a shroud 80 surrounding the enclosure 16 may be attached to frame 10 to channel downwardly the material emitted from the fenestrated side walls 18.

A switch 82 is positioned between the frame 10 and the arm 12. The switch 82 serves a two-fold function. First, it can be set to cut-off electrical power to the power feeder 78 when, due to an excess volume of material within the enclosure 16, the impeller 28 has floated upwardly a first predetermined distance, and resume electrical power to the power feeder 78 when the impeller 28 returns to its normal position due to material within the enclosure 16 having been dissipated through the fenestrated side walls 18 of the enclosure 16. Thereby, the switch 82 performs the function of detecting the magnitude of float of the impeller 28 in relation to the enclosure 16, which is due to the quantity of material within the enclosure 16, and based thereon turning off and on the power feeder 78 thereby regulating the rate of feed of material from the power feeder 78 into the enclosure 16.

The second function of the switch 82 is to cut-off electrical power to the motor 24 when the impeller 28 is raised out of the enclosure 16 a second predetermined distance by movement of the arm 12 about its pivotal connection 14 to the frame 10. This serves as a further safety function to shut the machine down completely in the event of malfunction of the machine and also to prevent injury to service personnel when the impeller assembly is intentionally removed from the enclosure. The aforesaid two functions of the switch 82 can be accomplished with one two stage switch as disclosed, or alternatively, two one stage switches.

There is thus provided a highly practical and efficient size reduction machine achieving all of the objects of the invention.

While the preferred embodiment of the invention has been shown and described herein, it is to be appreciated that various changes, rearrangements and modifications may be made therein without departing from scope of the invention as defined by the appended claims.

What is claimed is:

1. Apparatus for reducing the particle size of materials comprising:
   a frame;
   an arm pivotally connected intermediate its ends to said frame;
   a counter weight movably mounted on one end of said arm;
   a motor having a drive shaft mounted on the other end of said arm;
   an impeller connected to the free end of said motor shaft;
   an enclosure carried by said frame below said motor, said enclosure having fenestrated side walls and an open top for receiving the motor shaft and said impeller, said enclosure being spaced apart from said impeller, said impeller being movable into and out of said enclosure upon pivotal movement of said arm; and
   an adjustable stop positioned between said frame and said arm for limiting the maximum downward travel of said impeller into said enclosure, but not restricting upward travel of said impeller within said enclosure.

2. Apparatus as in claim 1, further comprising means for disabling said rotational means when said impeller is out of said enclosure.

3. Apparatus as in claim 1, wherein said enclosure comprises fenestrated, inverted frusta-conical side walls having an open top and an imperforate bottom wall.

4. Apparatus as in claim 3, further comprising:
   a base plate carried by said frame having a beveled circular opening therein for receiving said inverted frusta-conical enclosure;
   an inverted frusta-conical adaptor open at both ends, the bottom end portion of said adaptor fitting into the top end portion of said enclosure;
   means for clamping said adaptor to said base plate to wedge the upper portion of the side wall of said enclosure between the beveled edge of said base plate and said adaptor; and
   a cover plate removably attached to the top of said adaptor, having a first opening therein for receiving material, and a second opening therein for rotatably receiving the drive shaft of said motor.

5. Apparatus as in claim 4, wherein said means for clamping comprises an exterior concentric flange on said adaptor spaced above the bottom edge of said adaptor and having a plurality of concentric, spaced apart, beveled depressions therein, each depression having a key hole slot therethrough; and a like number of fasteners extending through said slots into said base plate, whereby rotation of said adaptor in one direction causes said beveled depressions to be progressively forced against the heads of said fasteners thereby causing said adaptor to be forced downwardly toward said base plate to wedge the upper portion of the side wall of said enclosure between said adaptor and the beveled portion of said base plate, and whereby rotation of said adaptor in the opposite direction releases said beveled depressions from the heads of said fasteners and aligns the key hole slots with said heads to accommodate removal of said adaptor from said base plate to facilitate access to said enclosure for repair and replacement.

6. Apparatus as in claim 4, further comprising:
   a power feeder adjacent said first opening in said cover plate for feeding material through said first opening into said enclosure; and
   switching means, positioned between said frame and said arm, for regulating the rate of feed of material from said power feeder to said enclosure based on the position of said arm in relationship to said frame.

7. Apparatus as in claim 1, wherein said impeller comprises a plurality of blades radiating from the drive shaft of said motor, each blade having a semi-circular cross-section for at least a portion of its length, the circular part of said semi-circular portion being adjacent the fenestrated side walls of said enclosure when said impeller is within said enclosure.

* * * * *